United States Patent
Xu et al.

(10) Patent No.: US 9,337,962 B2
(45) Date of Patent: May 10, 2016

(54) CONTINUOUS MODE OPERATION FOR WIRELESS COMMUNICATIONS SYSTEMS

(75) Inventors: Hao Xu, San Diego, CA (US); Madhavan S. Vajapeyam, San Diego, CA (US); Naga Bhushan, San Diego, CA (US); Wanshi Chen, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 631 days.

(21) Appl. No.: 13/029,072

(22) Filed: Feb. 16, 2011

(65) Prior Publication Data

US 2011/0200020 A1  Aug. 18, 2011

Related U.S. Application Data (60) Provisional application No. 61/305,490, filed on Feb. 17, 2010.

(51) Int. Cl.
 *H04L 1/16* (2006.01)
 *H04L 1/18* (2006.01)

(52) U.S. Cl.
 CPC ............ *H04L 1/1657* (2013.01); *H04L 1/1854* (2013.01); *H04L 1/1887* (2013.01)

(58) Field of Classification Search
 CPC .... H04L 1/1657; H04L 1/1854; H04L 1/1887
 USPC ........................................................ 370/336
 See application file for complete search history.

(56) References Cited

U.S. PATENT DOCUMENTS

| | | | |
|---|---|---|---|
| 7,864,798 B2 | 1/2011 | Chandra et al. | |
| 2002/0009061 A1* | 1/2002 | Willenegger | 370/328 |
| 2006/0056355 A1 | 3/2006 | Love et al. | |
| 2006/0073791 A1* | 4/2006 | Senarath et al. | 455/67.13 |
| 2009/0046627 A1* | 2/2009 | Xu | 370/328 |
| 2009/0264127 A1* | 10/2009 | Chun et al. | 455/435.2 |
| 2009/0268707 A1* | 10/2009 | Pani et al. | 370/345 |
| 2010/0111058 A1* | 5/2010 | Fischer | 370/338 |
| 2011/0117948 A1 | 5/2011 | Ishii et al. | |

FOREIGN PATENT DOCUMENTS

| | | |
|---|---|---|
| CN | 101621849 A | 1/2010 |
| JP | 2009135940 A | 6/2009 |
| TW | 200830750 A | 7/2008 |

(Continued)

OTHER PUBLICATIONS

Haiming Wang, et al., "Performance of TTI Bundling of VoIP in EUTRAN TDD Mode," IEEE (2009), pp. 1-5.

(Continued)

*Primary Examiner* — Stephen J Clawson
(74) *Attorney, Agent, or Firm* — Anthony R. Morris (57) ABSTRACT

Certain aspects of the present disclosure propose techniques for a continuous communications mode in a wireless communications system. The technique may involve processing bundles of transmission time interval (TTI) transmissions having transmission times that are mapped to voice-over-internet-protocol (VOIP) arrival times, wherein the bundled TTI transmissions are processed without acknowledgements to indicate the bundled TTI transmissions have been successfully received.

48 Claims, 8 Drawing Sheets

(56) References Cited

FOREIGN PATENT DOCUMENTS

| | | |
|---|---|---|
| WO | WO-2008131530 A1 | 11/2008 |
| WO | WO-2009038297 A1 | 3/2009 |
| WO | WO-2009133954 A1 | 11/2009 |
| WO | 20090157729 A2 | 12/2009 |
| WO | 2010063166 A1 | 6/2010 |

OTHER PUBLICATIONS

Riikka Susitaival, "LTE Coverage Improvement by TTI Bundling," IEEE (2009). pp. 1-5.

Ericsson: "On Uplink Coverage for LTE", 3GPP Draft, R1-080865, 3RD Generation Partnership Project (3GPP), Mobile Competence Centre, 650, Route Des Lucioles, F-06921 Sophia-Antipolis Cedex, France, vol. RAN WG1, No. Sorrento, Italy, 20080206, Feb. 6, 2008, XP050109344, [retrieved on Feb. 6, 2008].

International Search Report and Written Opinion—PCT/US2011/025340, ISA/EPO—Apr. 28, 2011.

Jiang D., et al., "Uplink VoIP Performance in E-UTRAN TDD Mode", Vehicular Technology Conference, 2008, VTC Spring, IEEE, IEEE, Piscataway, NJ, USA, May 11, 2008, pp. 2482-2486, XP031256011, ISBN: 978-1-4244-1644-8.

Taiwan Search Report—TW100105291—TIPO—Oct. 30, 2013.

\* cited by examiner

CONTINUOUS MODE OPERATION FOR WIRELESS COMMUNICATIONS SYSTEMS

CLAIM OF PRIORITY UNDER 35 U.S.C. §119

The present Application for Patent claims priority to U.S. Provisional Application No. 61/305,490, entitled "METHOD AND APPARATUS THAT FACILITATES CONTINUOUS MODE OPERATION IN LONG TERM EVOLUTION SYSTEMS," filed Feb. 17, 2010, and assigned to the assignee hereof and expressly incorporated herein by reference.

TECHNICAL FIELD

Certain aspects of the present disclosure generally relate to wireless communications and, more particularly, to techniques for a continuous communications mode.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

SUMMARY

Certain aspects of the present disclosure provide a method for communications in a wireless communications system. The method generally includes receiving configuration signaling from a base station to enter a continuous communications mode and processing bundles of transmission time interval (TTI) transmissions having transmission times that are mapped to periodic packet arrival times, wherein the bundled TTI transmissions are processed without acknowledgements to indicate the bundled TTI transmissions have been successfully received.

Certain aspects of the present disclosure provide an apparatus for communications in a wireless communications system. The apparatus generally includes means for receiving configuration signaling from a base station to enter a continuous communications mode and means for processing bundles of transmission time interval (TTI) transmissions having transmission times that are mapped to periodic packet arrival times, wherein the bundled TTI transmissions are processed without acknowledgements to indicate the bundled TTI transmissions have been successfully received.

Certain aspects of the present disclosure provide an apparatus for communications in a wireless communications system. The apparatus generally includes at least one processor configured to receive configuration signaling from a base station to enter a continuous communications mode and process bundles of transmission time interval (TTI) transmissions having transmission times that are mapped to periodic packet arrival times, wherein the bundled TTI transmissions are processed without acknowledgements to indicate the bundled TTI transmissions have been successfully received, and a memory coupled with the at least one processor.

Certain aspects of the present disclosure provide a computer-program product for communications in a wireless communications system, the computer-program product comprising a computer-readable medium. The computer-readable medium generally includes code for receiving configuration signaling from a base station to enter a continuous communications mode and processing bundles of transmission time interval (TTI) transmissions having transmission times that are mapped to periodic packet arrival times, wherein the bundled TTI transmissions are processed without acknowledgements to indicate the bundled TTI transmissions have been successfully received.

Certain aspects of the present disclosure provide a method for communications in a wireless communications system. The method generally includes transmitting configuration signaling to at least one user equipment (UE) to enter a continuous communications mode and processing bundles of transmission time interval (TTI) transmissions having transmission times that are mapped to periodic packet arrival times, wherein the bundled TTI transmissions are processed without acknowledgements to indicate the bundled TTI transmissions have been successfully received.

Certain aspects of the present disclosure provide an apparatus for communications in a wireless communications system. The apparatus generally includes means for transmitting configuration signaling to at least one user equipment (UE) to enter a continuous communications mode and means for processing bundles of transmission time interval (TTI) transmissions having transmission times that are mapped to periodic packet arrival times, wherein the bundled TTI transmissions are processed without acknowledgements to indicate the bundled TTI transmissions have been successfully received.

Certain aspects of the present disclosure provide an apparatus for communications in a wireless communications system. The apparatus generally includes at least one processor configured to transmit configuration signaling to at least one user equipment (UE) to enter a continuous communications mode and process bundles of transmission time interval (TTI) transmissions having transmission times that are mapped to periodic packet arrival times, wherein the bundled TTI transmissions are processed without acknowledgements to indicate the bundled TTI transmissions have been successfully received, and a memory coupled with the at least one processor.

Certain aspects of the present disclosure provide a computer-program product for communications in a wireless communications system, the computer-program product comprising a computer-readable medium. The computer-readable medium generally includes code for transmitting configuration signaling to at least one user equipment (UE) to enter a continuous communications mode and processing bundles of transmission time interval (TTI) transmissions having transmission times that are mapped to periodic packet arrival times, wherein the bundled TTI transmissions are processed without acknowledgements to indicate the bundled TTI transmissions have been successfully received.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization, has similar performance and essentially the same overall complexity as those of an OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
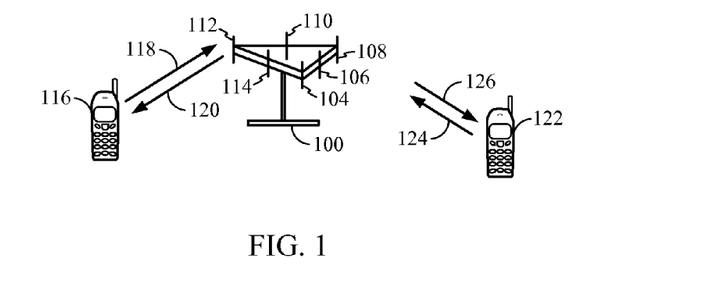
FIG. 1 is an illustration of a wireless communication system in accordance with various aspects set forth herein.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 104 and 106, where antennas 104 and 106 transmit information to access terminal 122 over forward link 126 and receive information from access terminal 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access point. In one embodiment, antenna groups are designed to communicate to access terminals in a sector of the areas covered by access point 100.

In communication over forward links 120 and 126, the transmitting antennas of access point 100 utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called a wireless terminal, user equipment (UE), a wireless communication device, terminal, or some other terminology.

Figure 2:
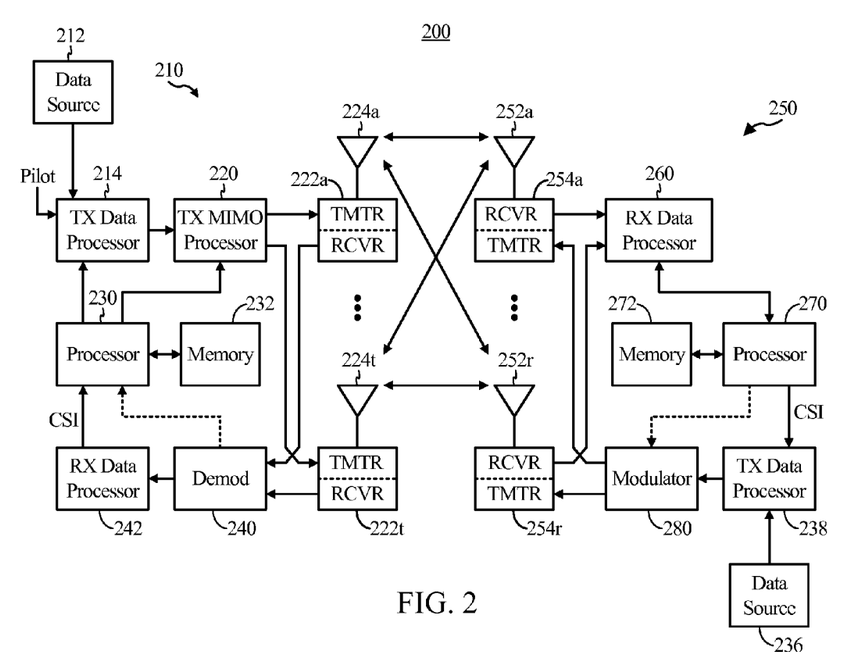
FIG. 2 is an illustration of an example wireless network environment that can be employed in conjunction with the various systems and methods described herein.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230. Instructions performed by processor 230 may be stored in memory 232, which may be coupled to processor 230. Memory 232 may be external or internal to processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. Instructions performed by processor 270 may be stored in memory 272, which may be coupled to processor 270. Memory 272 may be external or internal to processor 270.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights and processes the extracted message.

In an aspect, logical channels are classified into Control Channels and Traffic Channels. Logical Control Channels comprise Broadcast Control Channel (BCCH) which is DL channel for broadcasting system control information, Paging Control Channel (PCCH) which is DL channel that transfers paging information, Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS. Dedicated Control Channel (DCCH) is a Point-to-point bi-directional channel that transmits dedicated control information and used by UEs having an RRC connection. In aspect, Logical Traffic Channels comprise a Dedicated Traffic Channel (DTCH) which is a Point-to-point bi-directional channel, dedicated to one UE, for the transfer of user information, and a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprise a Random Access Channel (RACH), a Request Channel (REQCH), a Uplink Shared Data Channel (UL-SDCH) and plurality of PHY channels. The PHY channels comprise a set of DL channels and UL channels.

The DL PHY channels comprise:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprise:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)
In an aspect, a channel structure is provided that preserves low PAPR (at any given time, the channel is contiguous or uniformly spaced in frequency) properties of a single carrier waveform.

For the purposes of the present document, the following abbreviations apply:
AM Acknowledged Mode
AMD Acknowledged Mode Data
ARQ Automatic Repeat Request
BCCH Broadcast Control CHannel
BCH Broadcast CHannel C- Control-
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast and Multicast Service
MCCH MBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCH Physical CHannels
RACH Random Access CHannel
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN multicast broadcast single frequency network
MCE MBMS coordinating entity
MCH multicast channel
DL-SCH downlink shared channel
MSCH MBMS control channel
PDCCH physical downlink control channel
PDSCH physical downlink shared channel
PUSCH physical uplink shared channel Certain aspects of the present disclosure provide techniques for facilitating a continuous mode operation in wireless communications systems, such as LTE systems.

It may be noted that standards for packet-based systems, such as LTE, have mainly focused on the best effort (BE) data traffic optimization. However, for voice-over-internet-protocol (VOIP) applications, there are some drawbacks, when compared to other systems, such as CDMA 1×, which are typically optimized only for voice.

One example drawback relates to the link budget issue that is inherent in time-division-multiplexing (TDM) systems. Bundling of transmissions with a single grant for multiple TTI transmissions requiring only a single HARQ feedback per bundle is allowed in LTE. However, since the LTE specification limits bundling to 4, link budget issues still exist for cell edge users. Moreover, with such bundling, there may always be a conflict because of the 16 ms transmission time interval (TTI) hybrid automatic repeat request (HARQ) turn around time and the typical 20 ms of VOIP packet arrival time.

According to certain aspects, a continuous mode operation for communication in a wireless system is provided by mapping the timing of bundled TTI transmissions to VOIP packet arrival time and eliminating the need to acknowledge the bundle. According to certain aspects, this technique may provide gain for link budget limited users, such as those at a cell edge. According to certain aspects, the continuous mode may be enabled and disabled based on location within a cell, for example, as determined by received signal strength at a UE.

The following description provides illustrative, but not limiting, examples of techniques for a continuous mode operation that may be utilized in VOIP applications. Those skilled in the art will recognize, however, that the techniques presented herein may be more generally applied to a variety of applications that may require consistent system resources for an extended period of time (e.g., over durations of seconds or minutes), such as applications where video and/or audio are streamed to mobile devices, such as smart phones and tablets.

Figure 3:
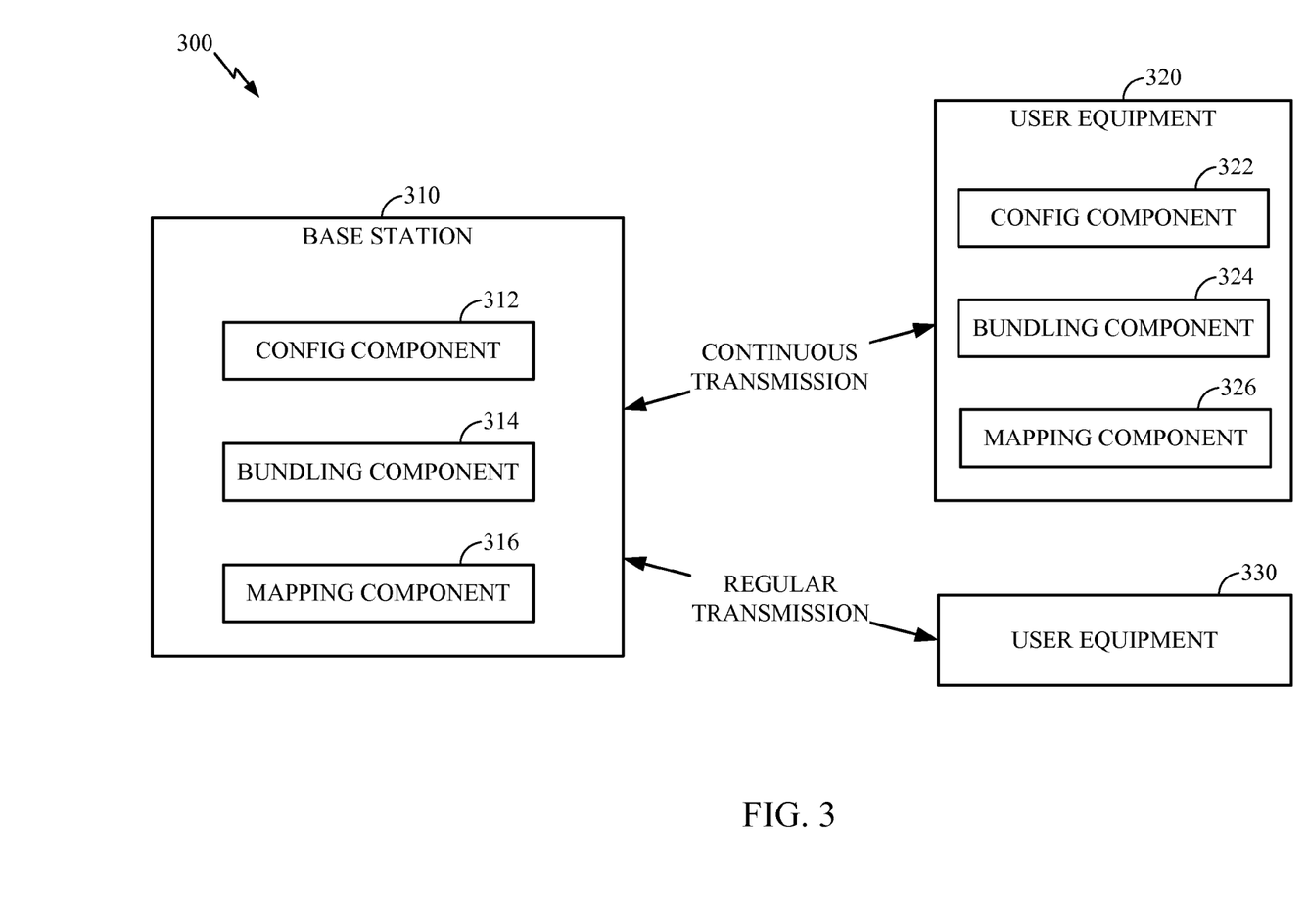
FIG. 3 is an illustration of an exemplary environment that facilitates continuous mode operation according to an embodiment.

FIG. 3 illustrates an example wireless environment 300, in which a continuous mode operation may be utilized, in accordance with aspects of the present disclosure. As shown, environment 300 includes base station 310, which is communicatively coupled to wireless terminal 320 and wireless terminal 330.

According to certain aspects, base station 310 may include a configuration component 312 to provide configuration data to each of wireless terminal 320 and wireless terminal 330 to enable a continuous mode operation. The wireless terminal 320 may include a configuration component 322 configured to receive the configuration data (or other signaling) from the base station 310 and enable/disable continuous mode communications accordingly.

For this particular embodiment illustrated in FIG. 3, a continuous mode operation between base station 310 and wireless terminal 320 may be facilitated, whereas base station 310 and wireless terminal 330 communicate via a regular transmission (e.g., with no bundling and/or conventional HARQ bundling). While in the continuous transmission mode, the base station 310 and wireless terminal 320 may utilize TTI bundles, with transmission times mapped to voice-over-internet-protocol (VOIP) arrival times. As illustrated, the base station 310 may include a bundling component 314 and mapping component 316 to bundle TTIs and map the bundled TTI transmission time to a VOIP arrival time. As the continuous mode may be applied on both uplink and downlink communications, the wireless terminal 320 may also include a bundling component 324 and mapping component 326.

Figure 4:
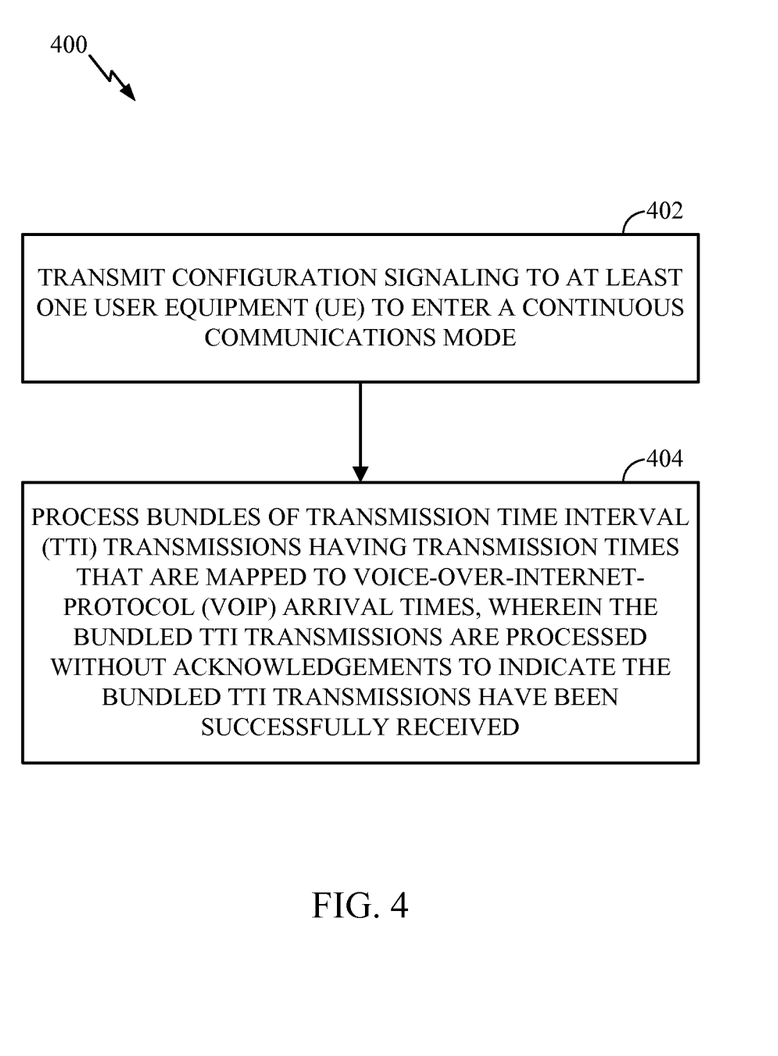
FIG. 4 is a block diagram of an exemplary method, according to an embodiment.

FIG. 4 illustrates example operations 400 that may be performed, for example, by a base station (such as BS 310 of FIG. 3). The operations 400 begin, at 402, by transmitting configuration signaling to at least one user equipment (UE) to enter a continuous communications mode. In this manner, users may be semi-statically configured in continuous mode. For example, users can start and stop continuous transmission through PDCCH assignment and de-assignment.

At 404, bundles of transmission time interval (TTI) transmissions having transmission times that are mapped to voice-over-internet-protocol (VOIP) arrival times are processed, wherein the bundled TTI transmissions are processed without acknowledgements to indicate the bundled TTI transmissions have been successfully received. The processing may comprise receiving bundled TTI transmissions transmitted on an uplink from the UE or transmitting bundled TTI transmissions to the UE on the downlink.

Figure 5:
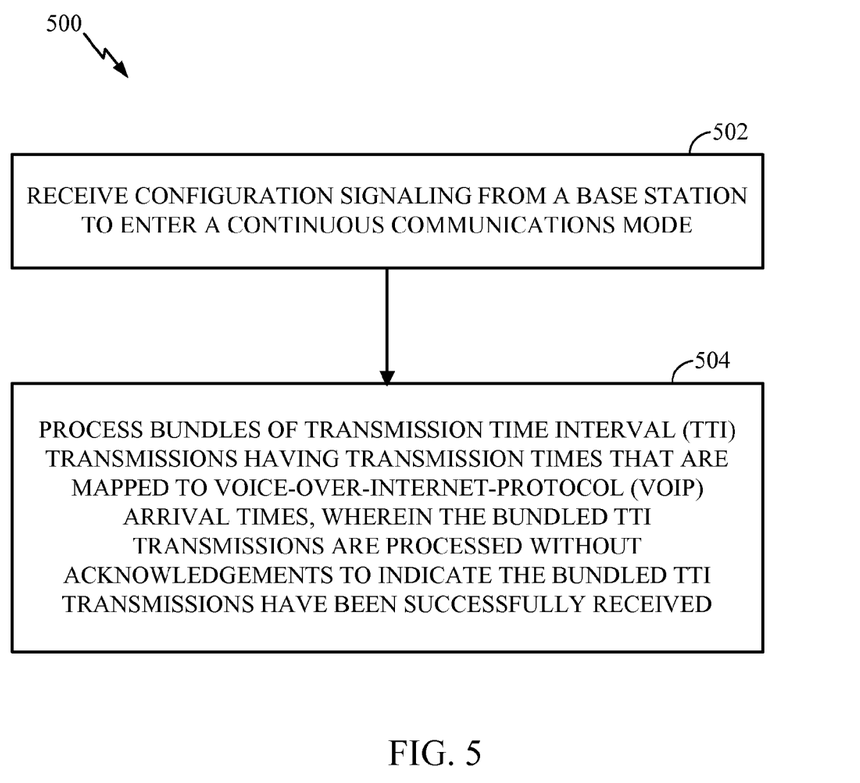
FIG. 5 is a block diagram of an exemplary method, according to an embodiment.

FIG. 5 illustrates example operations 500 that may be performed, for example, by a user equipment (such as UE 320 of FIG. 3). The operations 500 begin, at 502, by receiving configuration signaling from a base station to enter a continuous communications mode. At 504, bundles of transmission time interval (TTI) transmissions having transmission times that are mapped to voice-over-internet-protocol (VOIP) arrival times are processed, wherein the bundled TTI transmissions are processed without acknowledgements to indicate the bundled TTI transmissions have been successfully received.

According to certain aspects, multiple users may be multiplexed within one resource block (RB) to trade off between link budget and user capacity. For example, frequency division multiplexing (FDM), code division multiplexing and frequency division multiplexing (CDM/FDM), or spatial division multiple access (SDMA) approaches may be used for VOIP enhancement. Users may also be time-multiplexed together, for example, with resources allocated based on their VOIP activity time.

Under some conditions, the continuous transmission mode described herein may provide various advantages, such as gain for link budget limited users (e.g., at the cell edge). According to certain aspects, higher layer signaling (to enable/disable) may be configured to reduce physical downlink control channel (PDCCH) overhead. Bundled transmissions, in general, may provide link budget gain with coding across bundled sub-frames, cross sub-frame channel estimation, and exploitation of time domain diversity gain. Different levels of bundling may be selected for different users (e.g., depending on link budget).

According to certain aspects, HARQ feedback is not required for the bundled transmissions mapped to VOIP arrival times. In addition to simplifying scheduling, this may also resolve the conflict between HARQ turnaround time and VOIP packet arrival time. Not requiring HARQ feedback also removes the need for acknowledgement (ACK) resources for the DL or UL.

Figure 6:
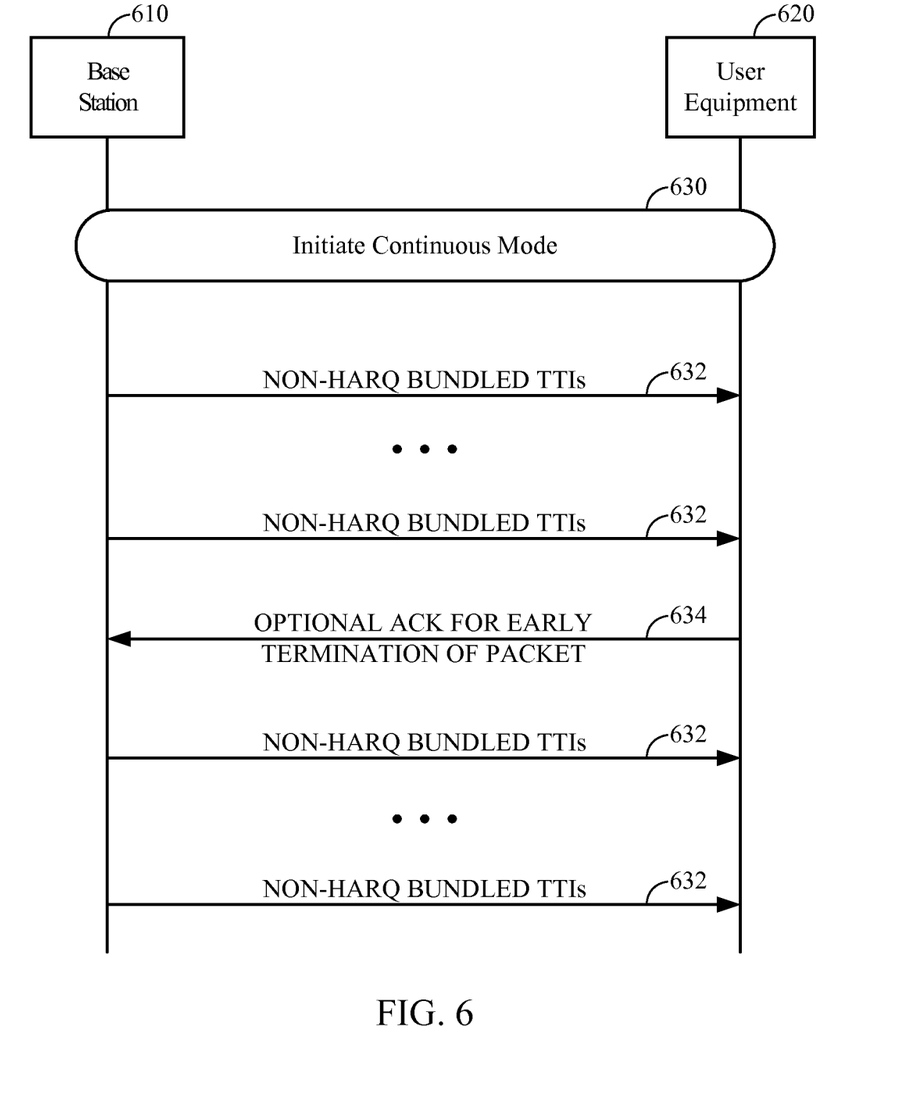
FIG. 6 is an example message exchange for early termination of continuous communications mode, according to an embodiment.

As illustrated in FIG. 6, however, in some cases an ACK may be used to allow early termination and discontinuous reception (DRX). As illustrated, continuous mode may be initiated at 630, for example, with a base station 610 sending configuration data (e.g., via a PDCCH) to a UE 620. In the continuous mode, NON-HARQ bundled TTI transmissions 632 (with transmission times mapped to VOIP arrival times) may be transmitted from the BS 610 to the UE 620, without the need for HARQ ACKs.

However, the UE 620 may cause early termination of a packet when in the continuous mode by transmitting an ACK message at 634. As illustrated, while transmission of that packet may be terminated early, the continuous mode may be maintained, for example, with the subsequent transmission of additional NON-HARQ bundled TTI transmissions 632.

Early termination of a packet may be prompted by a UE, for example, after continuously trying to decode the data, once decoded, the UE can enter into DRX mode to save power. While the Example in FIG. 6 illustrates downlink bundled transmissions only, continuous mode communications may be both uplink and downlink. Further, while the illustrated example shows a UE performing early termination by sending an ACK, a BS 610 may also be capable of terminating continuous mode by sending an ACK to the UE 620. According to certain aspects, a base station may transmit an ACK at a pre-agreed time before the end of each transmission if CRC passes. The UE may detect the ACK and terminate transmissions. This early termination may save battery life for UE and reduce UL interference.

In addition to early termination via ACK messaging, according to certain aspects, a system may transition between continuous and regular transmissions modes. For example, during active talking time, continuous transmission mode may be used. However, during silence time, a silence identifier (SID) may be transmitted (e.g., at an 160 ms interval). Since this SID is transmitted at a much longer duty cycle, regular transmission mode may be used during the indicated silence time.

According to certain aspects, time/frequency resources may be partitioned for different users/applications. At any given time, some users may communicate in continuous mode, while others communicate using regular transmission mode. The particular configuration may depend on a variety of factors, such as available resources, Quality of Service (QoS) requirements for different applications, and link budget for each user.

The particular TTI transmissions bundled and mapped to VOIP arrival times that are allocated to any particular user may also vary. FIGS. 7-11 illustrate a plurality of example options for allocating resources for a continuous VOIP transmission.

Figure 7:
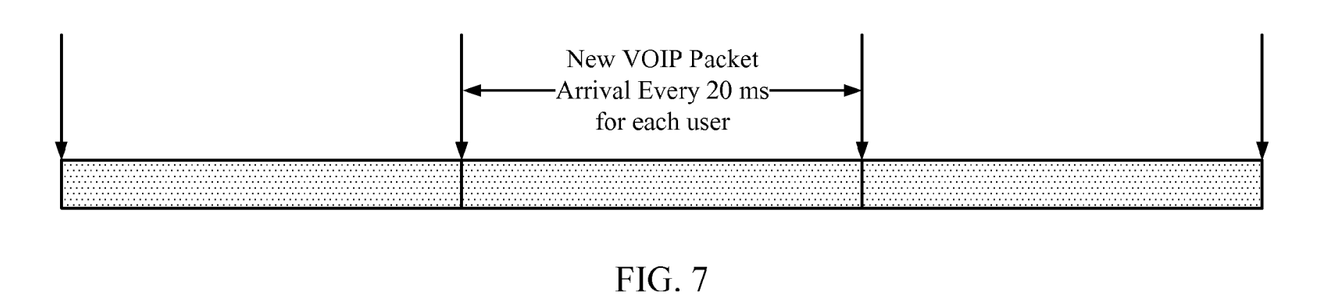
FIG. 7-11 illustrate exemplary options for allocating resources in a continuous voice-over-internet-protocol transmission, according to certain example embodiments.

FIG. 7 illustrates a first option in which each user may effectively have 20 ms TTI bundling, matched to an exemplary 20 ms VOIP packet arrival time. Different users may be multiplexed within each RB through FDM or hybrid FDM/CDM. In cases where there are a lot of users, however, this may result in a heavy processing load and a spike in resource consumption with bundled transmissions to a plurality of users, followed by a relatively long period of little or no activity, which is less than optimal resource utilization.

Figure 8:
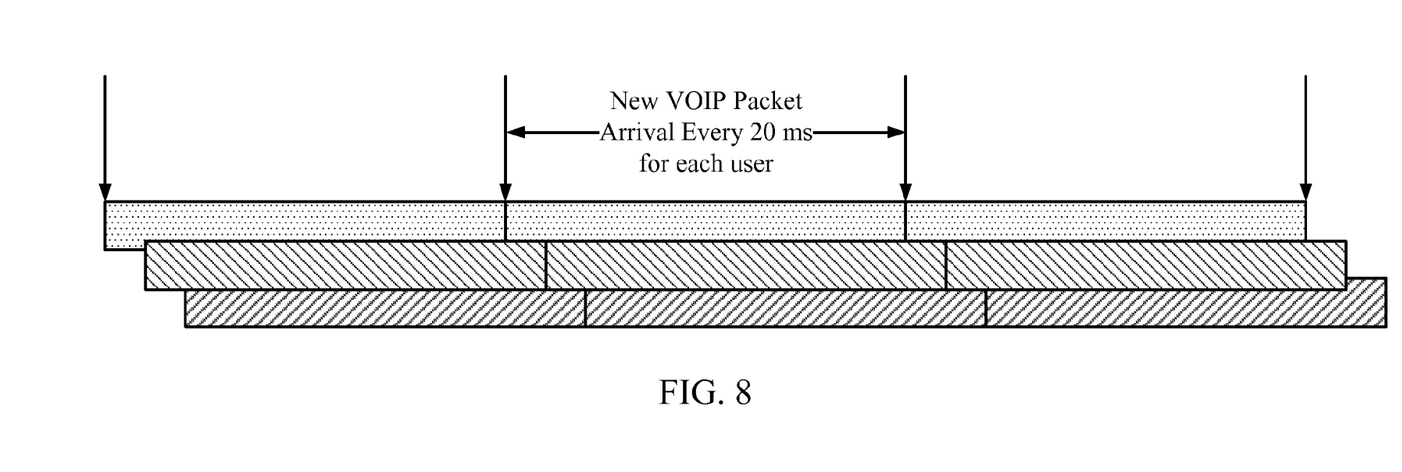
Figure 9:
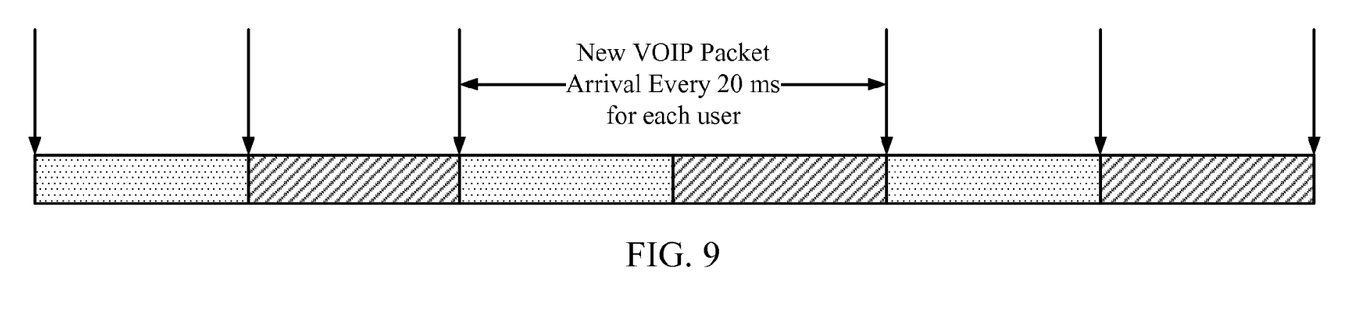
Figure 10:
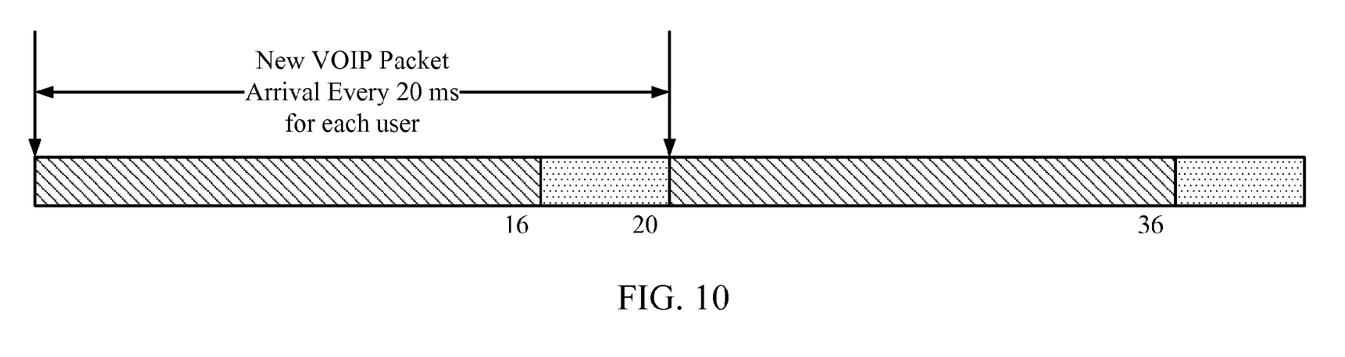
Figure 11:
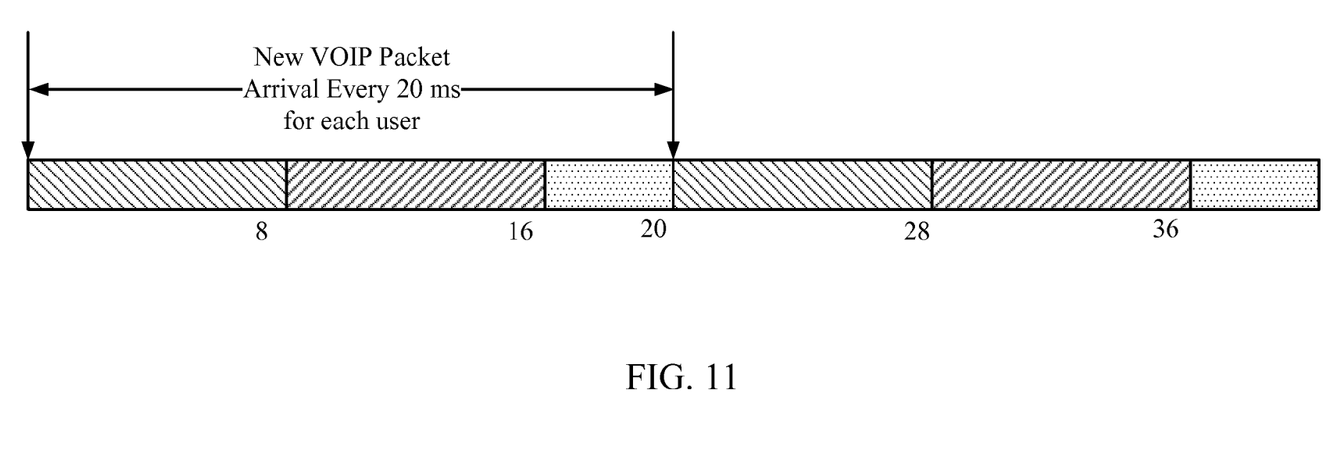

FIG. 8 illustrates a second option in which each user has a staggered bundled TTI transmission time. When compared to the option illustrated in FIG. 7, this approach may more evenly distribute signaling as well as processing load. FIG. 9 illustrates a third option in which users have effectively 10 ms TTI bundling, with two groups of users sharing in time. FIGS. 10 and 11 illustrate fourth and fifth options in which users have various degrees of bundling (e.g., mixed with 16/4 ms TTI bundles as illustrated in FIG. 10 and mixed with 8/8/4 ms TTI bundles as illustrated in FIG. 11).

While a VOIP arrival time of every 20 ms and a TTI of 1 ms may be assumed for illustrative purposes, those skilled in the art will recognize that the TTI bundling and mapping presented herein may be applied with any combination of VOIP arrival times and TTI periods.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In one alternative, the storage medium may be integral to the processor. The processor and the storage medium may reside in an ASIC. The ASIC may reside in a user terminal. In one alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method, performed by a user equipment, for communications in a wireless communications system, the method comprising:
    receiving configuration signaling from a base station to enter a continuous communications mode;
    while in the continuous communications mode, receiving bundles of transmission time interval (TTI) transmissions having transmission times that are mapped to allocated periodic packet arrival times; and
    processing the bundles of TTI transmissions, wherein the bundled TTI transmissions are processed without acknowledgements to indicate the bundled TTI transmissions have been successfully received.

2. The method of claim 1, wherein the periodic packet arrival times are for voice-over-internet-protocol (VOIP) packets.

3. The method of claim 1, wherein the wireless communications system comprises a long term evolution (LTE) system.

4. The method of claim 1, wherein the signaling is conveyed via a physical downlink control channel (PDCCH).

5. The method of claim 1, wherein the processing comprises:
    receiving one or more bundles of TTI transmissions from the base station.

6. The method of claim 1, further comprising transmitting an acknowledgment to the base station to prompt early termination of a packet sent in the continuous communications mode.

7. The method of claim 1, wherein the processing comprises:
    transmitting one or more bundles of TTI transmissions to the base station.

8. The method of claim 1, further comprising:
    receiving an acknowledgement from the base station to terminate the continuous communications mode; and
    terminating the continuous communications mode in response to receiving the acknowledgement from the base station.

9. The method of claim 1, further comprising alternating between the continuous communications mode during an active talk and a regular communications mode during a silence time.

10. The method of claim 1, wherein a number of TTIs in each bundle corresponds to a time less than a periodic packet arrival time.

11. A user equipment for wireless communications, comprising:
    means for receiving configuration signaling from a base station to enter a continuous communications mode;
    means for receiving, while in the continuous communications mode, bundles of transmission time interval (TTI) transmissions having transmission times that are mapped to allocated periodic packet arrival times; and
    means for processing the bundles of TTI transmissions, wherein the bundled TTI transmissions are processed without acknowledgements to indicate the bundled TTI transmissions have been successfully received.

12. The user equipment of claim 11, wherein the periodic packet arrival times are for voice-over-internet-protocol (VOIP) packets.

13. The user equipment of claim 11, wherein the wireless communications system comprises a long term evolution (LTE) system.

14. The user equipment of claim 11, wherein the signaling is conveyed via a physical downlink control channel (PDCCH).

15. The user equipment of claim 11, wherein the means for processing comprises:
means for receiving one or more bundles of TTI transmissions from the base station.

16. The user equipment of claim 11, further comprising means for transmitting an acknowledgment to the base station to prompt early termination of a packet sent in the continuous communications mode.

17. The user equipment of claim 11, wherein the means for processing comprises:
means for transmitting one or more bundles of TTI transmissions to the base station.

18. The user equipment of claim 11, further comprising:
means for receiving an acknowledgement from the base station to terminate the continuous communication mode; and
means for terminating the continuous communications mode in response to receiving the acknowledgement from the base station.

19. The user equipment of claim 11, further comprising means for alternating between the continuous communications mode during an active talk and a regular communications mode during a silence time.

20. The user equipment of claim 11, wherein a number of TTIs in each bundle corresponds to a time less than a periodic packet arrival time.

21. A user equipment for wireless communications, comprising:
at least one processor configured to:
receive configuration signaling from a base station to enter a continuous communications mode;
receive, while in the continuous communications mode, bundles of transmission time interval (TTI) transmissions having transmission times that are mapped to allocated periodic packet arrival times; and
process the bundles of TTI transmissions, wherein the bundled TTI transmissions are processed without acknowledgements to indicate the bundled TTI transmissions have been successfully received; and
a memory coupled with the at least one processor.

22. A non-transitory computer-readable medium comprising code for causing a user equipment to perform the following operations:
receiving configuration signaling from a base station to enter a continuous communications mode;
receiving, while in the continuous communications mode, bundles of transmission time interval (TTI) transmissions having transmission times that are mapped to allocated periodic packet arrival times; and
processing the bundles TTI transmissions, wherein the bundled TTI transmissions are processed without acknowledgements to indicate the bundled TTI transmissions have been successfully received.

23. A method, performed by a base station, for communications in a wireless communications system, the method comprising:
transmitting configuration signaling to at least one user equipment (UE) to enter a continuous communications mode;
after transmitting the configuration signaling, receiving bundles of transmission time interval (TTI) transmissions having transmission times that are mapped to allocated periodic packet arrival times; and
processing the bundles of TTI transmissions, wherein the bundled TTI transmissions are processed without acknowledgements to indicate the bundled TTI transmissions have been successfully received.

24. The method of claim 23, wherein the periodic packet arrival times are for voice-over-internet-protocol (VOIP) packets.

25. The method of claim 23, wherein the wireless communications system comprises a long term evolution (LTE) system.

26. The method of claim 23, wherein the signaling is conveyed via a physical downlink control channel (PDCCH).

27. The method of claim 23, wherein the processing comprises:
transmitting one or more bundles of TTI transmissions to the at least one UE.

28. The method of claim 23, further comprising transmitting an acknowledgment to the at least one UE to terminate the continuous communications mode.

29. The method of claim 23, wherein the processing comprises:
receiving one or more bundles of TTI transmissions from the at least one UE.

30. The method of claim 23, further comprising:
receiving an acknowledgement from the at least one UE to terminate the continuous communications mode; and
terminating the continuous communications mode in response to receiving the acknowledgement from the at least one UE.

31. The method of claim 23, further comprising alternating between the continuous communications mode during an active talk and a regular communications mode during a silence time.

32. The method of claim 23, wherein:
the at least one UE comprises a plurality of UEs; and
the processing comprises transmitting bundled TTIs to different UEs at staggered transmission times.

33. The method of claim 23, wherein:
the at least one UE comprises a plurality of UEs; and
bundled TTI transmissions for more than one of the plurality of UEs are mapped to a same periodic packet arrival time.

34. The method of claim 23, wherein:
the at least one UE comprises a plurality of UEs; and
bundled transmissions for at least two of the plurality of UEs have different numbers of TTI transmissions.

35. A base station for wireless communications comprising:
means for transmitting configuration signaling to at least one user equipment (UE) to enter a continuous communications mode;
after transmitting the configuration signaling, receiving bundles of transmission time interval (TTI) transmissions having transmission times that are mapped to allocated periodic packet arrival times; and
means for processing the bundles of TTI transmissions having transmission times that are mapped to periodic packet arrival times, wherein the bundled TTI transmissions are processed without acknowledgements to indicate the bundled TTI transmissions have been successfully received.

36. The base station of claim 35, wherein the periodic packet arrival times are for voice-over-internet-protocol (VOIP) packets.

37. The base station of claim 35, wherein the wireless communications system comprises a long term evolution (LTE) system.

38. The base station of claim 35, wherein the signaling is conveyed via a physical downlink control channel (PDCCH).

39. The base station of claim 35, wherein the means for processing comprises:
   means for transmitting one or more bundles of TTI transmissions to the at least one UE.

40. The base station of claim 35, further comprising means for transmitting an acknowledgment to the at least one UE to terminate the continuous communications mode.

41. The base station of claim 35, wherein the means for processing comprises:
   means for receiving one or more bundles of TTI transmissions from the at least one UE.

42. The base station of claim 35, further comprising:
   means for receiving an acknowledgement from the at least one UE for terminating the continuous communications mode; and
   means for terminating the continuous communications mode in response to receiving the acknowledgement from the at least one UE.

43. The base station of claim 35, further comprising means for alternating between the continuous communications mode during an active talk and a regular communications mode during a silence time.

44. The base station of claim 35, wherein:
   the at least one UE comprises a plurality of UEs; and
   the means for processing comprises means for transmitting bundled TTIs to different UEs at staggered transmission times.

45. The base station of claim 35, wherein:
   the at least one UE comprises a plurality of UEs; and
   bundled TTI transmissions for more than one of the plurality of UEs are mapped to a same periodic packet arrival time.

46. The base station of claim 35, wherein:
   the at least one UE comprises a plurality of UEs; and
   bundled transmissions for at least two of the plurality of UEs have different numbers of TTI transmissions.

47. A base station for wireless communications comprising:
   at least one processor configured to:
      transmit configuration signaling to at least one user equipment (UE) to enter a continuous communications mode;
      after transmitting the configuration signaling, receiving bundles of transmission time interval (TTI) transmissions having transmission times that are mapped to allocated periodic packet arrival times; and
      process the bundles of TTI transmissions having transmission times that are mapped to periodic packet arrival times, wherein the bundled TTI transmissions are processed without acknowledgements to indicate the bundled TTI transmissions have been successfully received; and
   a memory coupled with the at least one processor.

48. A non-transitory computer-readable medium comprising code for causing a base station to perform the following operations:
   transmitting configuration signaling to at least one user equipment (UE) to enter a continuous communications mode;
   after transmitting the configuration signaling, receiving bundles of transmission time interval (TTI) transmissions having transmission times that are mapped to allocated periodic packet arrival times; and
   processing the bundles of TTI transmissions having transmission times that are mapped to periodic packet arrival times, wherein the bundled TTI transmissions are processed without acknowledgements to indicate the bundled TTI transmissions have been successfully received.

* * * * *